US009672562B1

(12) United States Patent
Vittal et al.

(10) Patent No.: US 9,672,562 B1
(45) Date of Patent: Jun. 6, 2017

(54) PRICE DETERMINATION IN AN AUCTION SYSTEM

(71) Applicant: FedBid, Inc., Vienna, VA (US)

(72) Inventors: Vinay Vittal, Herndon, VA (US);
Arthur Johnson, Alexandria, VA (US);
Luther Tupponce, Vienna, VA (US);
Joseph Sorisi, Old Brookville, NY (US)

(73) Assignee: FedBid, Inc., Vienna, VA (US)

( * ) Notice: Subject to any disclaimer, the term of this patent is extended or adjusted under 35 U.S.C. 154(b) by 499 days.

(21) Appl. No.: 13/750,079

(22) Filed: Jan. 25, 2013

(51) Int. Cl.
G06Q 30/06 (2012.01)
G06Q 30/08 (2012.01)
G06Q 30/02 (2012.01)

(52) U.S. Cl.
CPC ......... *G06Q 30/08* (2013.01); *G06Q 30/0283* (2013.01)

(58) Field of Classification Search
CPC ........................................... G06Q 30/06–30/08
USPC ................................................ 705/26.1–27.2
See application file for complete search history.

(56) References Cited

U.S. PATENT DOCUMENTS

| 6,976,005 | B1 | 12/2005 | Bansal et al. |
|---|---|---|---|
| 7,006,987 | B1 | 2/2006 | Xie et al. |
| 7,461,022 | B1 | 12/2008 | Churchill et al. |
| 7,571,137 | B2 | 8/2009 | Alaia et al. |
| RE41,545 | E | 8/2010 | Young |
| 7,958,040 | B2 | 6/2011 | Jain et al. |
| 7,962,402 | B2 | 6/2011 | Eydelman |
| 8,046,269 | B2 | 10/2011 | Lee et al. |
| 2001/0029478 | A1 | 10/2001 | Laster et al. |
| 2002/0128948 | A1 | 9/2002 | Wiesehuegel et al. |
| 2003/0195835 | A1 | 10/2003 | Sandholm et al. |
| 2004/0054551 | A1* | 3/2004 | Ausubel et al. ................. 705/1 |
| 2005/0114225 | A1 | 5/2005 | Longman et al. |
| 2007/0226118 | A1 | 9/2007 | Gill |
| 2008/0027803 | A1 | 1/2008 | Mendelevitch et al. |
| 2008/0114671 | A1 | 5/2008 | Goel et al. |

(Continued)

FOREIGN PATENT DOCUMENTS

| JP | 2010-128740 A | 6/2010 |
|---|---|---|
| WO | 00/45314 A2 | 8/2000 |
| WO | 01/82194 A2 | 11/2001 |

(Continued)

*Primary Examiner* — Ethan D Civan
*Assistant Examiner* — Ming Shui
(74) *Attorney, Agent, or Firm* — Fitzpatrick, Cella, Harper & Scinto

(57) ABSTRACT

An apparatus for computing a bid price for a plurality of items includes an input portion, a processing portion, and an output portion. The input portion is adapted to electronically receive a bid for an online auction listing for a plurality of items, the bid including a limit price and an initial bid price for each of the plurality of items, and a total bid price for an entirety of the plurality of items. The processing portion is adapted to electronically compute a bid price for each of the plurality of items, such that a sum of the computed bid prices for the plurality of items is substantially equal to the total bid price. The output portion is adapted to electronically transmit the computed bid prices for the plurality of items to an online auction portion, the online auction portion accepting the bid in accordance with the computed bid prices.

25 Claims, 15 Drawing Sheets

(56) References Cited

U.S. PATENT DOCUMENTS

2010/0325008 A1   12/2010   Michlitsch et al.

FOREIGN PATENT DOCUMENTS

| WO | 01/88796 A1 | 11/2001 |
| WO | 02/42981 A1 | 5/2002 |
| WO | 2010/151245 A1 | 12/2010 |

* cited by examiner

| Item No. | Quantity | "Rebid minimum" (low or floor) price, per item | "Initial bid" (high or goal) price, per item |
|---|---|---|---|
| 1 | 1 | $100 | $150 |
| 2 | 1 | $100 | $150 |
| 3 | 2 | $110 | $170 |
| 4 | 1 | $200 | $290 |

FIG. 4(a)

| Item No. | Quantity | "Rebid minimum" (low or floor price) | | "Initial bid" (high or goal price) | | Difference | |
|---|---|---|---|---|---|---|---|
| | | Per-unit price | Total Price | Per-unit price | Total Price | Per-unit price | Total Price |
| 1 | 1 | $100 | $100 | $150 | $150 | $50 | $50 |
| 2 | 1 | $100 | $100 | $150 | $150 | $50 | $50 |
| 3 | 2 | $110 | $220 | $170 | $340 | $60 | $120 |
| 4 | 1 | $200 | $200 | $290 | $290 | $90 | $90 |
| | | | $620 | | $930 | | |

Assume: price for next leading bid ("compete price") is $675

FIG. 4(b)

| Item No. | Quantity | "Rebid minimum" (low or floor) price | | "Initial bid" (high or goal) price | | Difference | | Bid price for each item | Gap |
|---|---|---|---|---|---|---|---|---|---|
| | | Per-unit price | Total Price | Per-unit price | Total Price | | Total Price | | |
| 1 | 1 | $100 | $100 | $150 | $150 | $50 | $50 | $150 | $55 $5 |
| 2 | 1 | $100 | $100 | $150 | $150 | $50 | $50 | | |
| 3 | 2 | $110 | $220 | $170 | $340 | $60 | $120 | | |
| 4 | 1 | $200 | $200 | $290 | $290 | $90 | $90 | | |

FIG. 6(a)

| Item No. | Quantity | "Rebid minimum" (low or floor) price | | "Initial bid" (high or goal) price | | Difference | | Bid price for each item | Gap |
|---|---|---|---|---|---|---|---|---|---|
| | | Per-unit price | Total Price | Per-unit price | Total Price | | Total Price | | |
| 1 | 1 | $100 | $100 | $150 | $150 | $50 | $50 | $150 | |
| 2 | 1 | $100 | $100 | $150 | $150 | $50 | $50 | $105 | $5 $0 |
| 3 | 2 | $110 | $220 | $170 | $340 | $60 | $120 | | |
| 4 | 1 | $200 | $200 | $290 | $290 | $90 | $90 | | |

FIG. 6(b)

| Item No. | Quantity | "Rebid minimum" (low or floor) price | | "Initial bid" (high or goal) price | | Difference | | Bid price for each item | Gap |
|---|---|---|---|---|---|---|---|---|---|
| | | Per-unit price | Total Price | Per-unit price | Total Price | | Total Price | | |
| 1 | 1 | $100 | $100 | $150 | $150 | $50 | $50 | $150 | |
| 2 | 1 | $100 | $100 | $150 | $150 | $50 | $50 | $105 | |
| 3 | 2 | $110 | $220 | $170 | $340 | $60 | $120 | $220 ($110 ea) | $0 |
| 4 | 1 | $200 | $200 | $290 | $290 | $90 | $90 | $200 | $0 |
| | | | | | | | | $675 | |

FIG. 6(c)

| Item No. | Quantity | "Rebid minimum" (low or floor price) | | "Initial bid" (high or goal price) | | Weight | Bid price for each item |
|---|---|---|---|---|---|---|---|
| | | Per-unit price | Total Price | Per-unit price | Total Price | | |
| 1 | 1 | $100 | $100 | $150 | $150 | 0.1613 | $108.87 |
| 2 | 1 | $100 | $100 | $150 | $150 | 0.1613 | $108.87 |
| 3 | 2 | $110 | $220 | $170 | $340 | 0.3871 | $241.30 ($120.65 ea) |
| 4 | 1 | $200 | $200 | $290 | $290 | 0.2903 | $215.97 |
| | | | | | | 1.0000 | $675.01 |

FIG. 9(a)

| Item No. | Quantity | "Rebid minimum" (low or floor price) | | "Initial bid" (high or goal price) | | Difference | | Bid price for each item |
|---|---|---|---|---|---|---|---|---|
| | | Per-unit price | Total Price | Per-unit price | Total Price | Per-unit price | Total Price | |
| 1 | 1 | $100 | $100 | $150 | $150 | $50 | ... | $108.87 |
| 2 | 1 | $100 | $100 | $150 | $150 | $50 | ... | $108.87 |
| 3 | 2 | $110 | $220 | $170 | $340 | $60 | ... | $241.30 ($120.65 ea) |
| 4 | 1 | $200 | $200 | $290 | $290 | $90 | ... | $215.97 |
| | | | | | | | | $675.01 |

FIG. 9(b)

| Item No. | Quantity | "Rebid minimum" (low or floor) price | | "Initial bid" (high or goal) price | | Difference | | Bid price for each item | Gap |
|---|---|---|---|---|---|---|---|---|---|
| | | Per-unit price | Total Price | Per-unit price | Total Price | Per-unit price | ... | | |
| 1 | 1 | $100 | $100 | $150 | $150 | $50 | $50 | $127.50 | $55 $0 |
| 2 | 1 | $100 | $100 | $150 | $150 | $50 | $50 | $127.50 | |
| 3 | 2 | $110 | $220 | $170 | $340 | $60 | $120 | | |
| 4 | 1 | $200 | $200 | $290 | $290 | $90 | $90 | | |

FIG. 11(a)

| Item No. | Quantity | "Rebid minimum" (low or floor) price | | "Initial bid" (high or goal) price | | Difference | | Bid price for each item | Gap |
|---|---|---|---|---|---|---|---|---|---|
| | | Per-unit price | Total Price | Per-unit price | Total Price | Per-unit price | Total Price | | |
| 1 | 1 | $100 | $100 | $150 | $150 | $50 | $50 | $127.50 | |
| 2 | 1 | $100 | $100 | $150 | $150 | $50 | $50 | $127.50 | |
| 3 | 2 | $110 | $220 | $170 | $340 | $60 | $120 | $220 ($110 ea) | $0 |
| 4 | 1 | $200 | $200 | $290 | $290 | $90 | $90 | $200 | $0 |
| | | | | | | | | $675 | |

FIG. 11(b)

| Item No. | Quantity | "Rebid minimum" (low or floor price), per item | "Initial bid" (high or goal price), per item |
|---|---|---|---|
| 1 | 1 | $100 | $170 |
| 2 | 3 | $100 | $170 |
| 3 | 2 | $110 | $160 |
| 4 | 1 | $200 | $290 |

FIG. 12(a)

| Item No. | Quantity | "Rebid minimum" (low or floor price) | | "Initial bid" (high or goal price) | | Difference | |
|---|---|---|---|---|---|---|---|
| | | Per-unit price | Total Price | Per-unit price | Total Price | Per-unit price | Total Price |
| 1 | 1 | $100 | $100 | $170 | $170 | $70 | $70 |
| 2 | 3 | $100 | $300 | $170 | $510 | $70 | $210 |
| 3 | 2 | $110 | $220 | $160 | $320 | $50 | $100 |
| 4 | 1 | $200 | $200 | $290 | $290 | $90 | $90 |
| | | | $820 | | $1290 | | |

Assume: price for next leading bid ("compete price") is $1180

FIG. 12(b)

| Item No. | Quantity | "Rebid minimum" (low or floor) price | | "Initial bid" (high or goal) price | | Difference | Bid price for each item | Gap |
|---|---|---|---|---|---|---|---|---|
| | | Per-unit price | Total Price | Per-unit price | Total Price | Total Price | | |
| 1 | 1 | $100 | $100 | $170 | $170 | $70 | $170 | ~~$360~~ $290 |
| 2 | 3 | $100 | $300 | $170 | $510 | $210 | | |
| 3 | 2 | $110 | $220 | $160 | $320 | $100 | | |
| 4 | 1 | $200 | $200 | $290 | $290 | $90 | | |

FIG. 13(a)

| Item No. | Quantity | "Rebid minimum" (low or floor) price | | "Initial bid" (high or goal) price | | Difference | Bid price for each item | Gap |
|---|---|---|---|---|---|---|---|---|
| | | Per-unit price | Total Price | Per-unit price | Total Price | Total Price | | |
| 1 | 1 | $100 | $100 | $170 | $170 | $70 | $170 | |
| 2 | 3 | $100 | $300 | $170 | $510 | $210 | $510 ($170 ea) | ~~$290~~ $80 |
| 3 | 2 | $110 | $220 | $160 | $320 | $100 | | |
| 4 | 1 | $200 | $200 | $290 | $290 | $90 | | |

FIG. 13(b)

| Item No. | Quantity | "Rebid minimum" (low or floor) price | | "Initial bid" (high or goal) price | | Difference | Bid price for each item | Gap |
|---|---|---|---|---|---|---|---|---|
| | | Per-unit price | Total Price | Per-unit price | Total Price | Total Price | | |
| 1 | 1 | $100 | $100 | $170 | $170 | $70 | $170 | |
| 2 | 3 | $100 | $300 | $170 | $510 | $210 | $510 ($170 ea) | |
| 3 | 2 | $110 | $220 | $160 | $320 | $100 | $300 ($150 ea) | ~~$80~~ $0 |
| 4 | 1 | $200 | $200 | $290 | $290 | $90 | | |

FIG. 13(c)

| Item No. | Quantity | "Rebid minimum" (low or floor) price | | "Initial bid" (high or goal) price | | Difference | Bid price for each item | Gap |
|---|---|---|---|---|---|---|---|---|
| | | Per-unit price | Total Price | Per-unit price | Total Price | Total Price | | |
| 1 | 1 | $100 | $100 | $170 | $170 | $70 | $170 | |
| 2 | 3 | $100 | $300 | $170 | $510 | $210 | $510 ($170 ea) | |
| 3 | 2 | $110 | $220 | $160 | $320 | $100 | $300 ($150 ea) | |
| 4 | 1 | $200 | $200 | $290 | $290 | $90 | <u>$200</u> | $0 |
| | | | | | | | $1180 | |

FIG. 13(d)

| Item No. | Quantity | "Rebid minimum" (low or floor price) | | "Initial bid" (high or goal price) | | Weight | Bid price for each item |
|---|---|---|---|---|---|---|---|
| | | Per-unit price | Total Price | Per-unit price | Total Price | | |
| 1 | 1 | $100 | $100 | $170 | $170 | 0.1489 | $153.61 |
| 2 | 3 | $100 | $100 | $170 | $510 | 0.4468 | $460.85 ($153.61 ea) |
| 3 | 2 | $110 | $220 | $160 | $320 | 0.2128 | $296.60 ($148.30 ea) |
| 4 | 1 | $200 | $200 | $290 | $290 | 0.1915 | 268.94 |
| | | | | | | 1.0000 | $1180 |

FIG. 14(a)

| Item No. | Quantity | "Rebid minimum" (low or floor price) | | "Initial bid" (high or goal price) | | Difference | | Bid price for each item |
|---|---|---|---|---|---|---|---|---|
| | | Per-unit price | Total Price | Per-unit price | Total Price | Per-unit price | Total Price | |
| 1 | 1 | $100 | $100 | $170 | $170 | $70 | | $153.62 |
| 2 | 3 | $100 | $300 | $170 | $510 | $70 | | $460.86 ($153.62 ea) |
| 3 | 2 | $110 | $220 | $160 | $320 | $50 | | $296.60 ($148.30 ea) |
| 4 | 1 | $200 | $200 | $290 | $290 | $90 | | $268.94 |
| | | | | | | | | $1180.02 |

FIG. 14(b)

| Item No. | Quantity | "Rebid minimum" (low or floor) price | | "Initial bid" (high or goal) price | | Difference | | Bid price for each item | Gap |
|---|---|---|---|---|---|---|---|---|---|
| | | Per-unit price | Total Price | Per-unit price | Total Price | Per-unit price | Total Price | | |
| 1 | 1 | $100 | $100 | $170 | $170 | $70 | $70 | | |
| 2 | 3 | $100 | $300 | $170 | $510 | $70 | $210 | | |
| 3 | 2 | $110 | $220 | $160 | $320 | $50 | $100 | $320 ($160 ea) | $360 $260 |
| 4 | 1 | $200 | $200 | $290 | $290 | $90 | $90 | | |

FIG. 15(a)

| Item No. | Quantity | "Rebid minimum" (low or floor) price | | "Initial bid" (high or goal) price | | Difference | | Bid price for each item | Gap |
|---|---|---|---|---|---|---|---|---|---|
| | | Per-unit price | Total Price | Per-unit price | Total Price | Per-unit price | Total Price | | |
| 1 | 1 | $100 | $100 | $170 | $170 | $70 | $70 | $165 | $260 $0 |
| 2 | 3 | $100 | $300 | $170 | $510 | $70 | $210 | $495 ($165 ea) | |
| 3 | 2 | $110 | $220 | $160 | $320 | $50 | $100 | $320 ($160 ea) | |
| 4 | 1 | $200 | $200 | $290 | $290 | $90 | $90 | | |

FIG. 15(b)

| Item No. | Quantity | "Rebid minimum" (low or floor) price | | "Initial bid" (high or goal) price | | Difference | | Bid price for each item | Gap |
|---|---|---|---|---|---|---|---|---|---|
| | | Per-unit price | Total Price | Per-unit price | Total Price | Per-unit price | Total Price | | |
| 1 | 1 | $100 | $100 | $170 | $170 | $70 | $70 | $165 | |
| 2 | 3 | $100 | $300 | $170 | $510 | $70 | $210 | $495 ($165 ea) | |
| 3 | 2 | $110 | $220 | $160 | $320 | $50 | $100 | $320 ($160 ea) | |
| 4 | 1 | $200 | $200 | $290 | $290 | $90 | $90 | $200 | $0 |
| | | | | | | | | $1180 | |

FIG. 15(c)

PRICE DETERMINATION IN AN AUCTION SYSTEM

BACKGROUND OF THE INVENTION

Field of the Invention

The invention relates to a determination of pricing for items in an online auction system.

Description of the Related Art

Online auctions are becoming a commonplace approach for buying and/or selling goods and services. Auctions utilize a free-market approach to assess the actual market value of the goods and services, by introducing competition and allowing the marketplace to set the pricing according to demand.

Online auctions can be organized in many different formats. Two distinct approaches are the "forward auction" and "reverse auction" configurations. In a forward auction, a seller creates an auction listing for one or more goods or services, and the bidders are buyers looking to purchase the auction item(s) in the listing. Customarily, the seller will set a low initial price, and each successive bidder will submit a successively higher bid until the auction ends. The highest bidder at the end of the auction is the winner and receives the auction item(s) in exchange for payment of the bid amount.

In a reverse auction, it is a buyer, not a seller, who creates an auction listing. The buyer is seeking a particular good or service (or multiple goods or services) and creates the auction listing with a request for such items, seeking sellers to accommodate the request. The bidders in a reverse auction are potential sellers looking to accommodate the items for a price. The buyer will set a high initial price, and each successive bidder will submit a successively lower bid until the auction ends. The lowest bidder at the end of the auction is typically the winner and receives the bid amount in exchange for providing the requested item(s) to the buyer. It is noted that some auctions may incorporate award criteria besides simply pricing. For instance, in a reverse auction, a buyer may utilize award criteria other than price, such that the lowest bidder may not necessarily be the winner as selected by the buyer.

Some auction transactions may involve more than a single item. For instance, a transaction may involve a set of items, with multiple quantities of a particular item and even multiple different item types. As an example, an auction transaction for computer equipment may involve a batch of desktop units, laptop units, monitors, and printers. An auction format may solicit bids for this transaction based on the pricing value for the entire batch, and not for a particular item within the batch.

This situation may apply to both forward auctions and reverse auctions. In the case of a forward auction, a seller of the collection creates an auction listing with an initial selling bid price, and potential purchasers would bid on the collection, driving up the bid price while the listing remains active. In a reverse auction, a purchaser would create an auction listing with a collection of desired purchase items and an initial desired price, and potential sellers would bid to satisfy the desired collection of purchase items, driving the bid price down while the listing remains active.

Despite the bid pricing being based on the entire collection, a party may retain interest in the pricing of individual items within the collection. For instance, the bidding party may be interested in individual-item pricing for specific record-keeping and financial data, for reviewing the price of such items in previous auctions, to arrange for sub-contractors to fulfill items, or for any other purpose. However, the batch nature of the auction transaction hinders the breakdown of individual items.

For example, in a reverse auction, a bidder (i.e., seller) may formulate a bidding strategy based on a set floor price for each item (commonly known as a "limit" price or "floor" price). However, when submitting a bid for the collection that is above an aggregate floor price for the whole collection, the auction may rank competing bids according to an aggregated amount, or may only accept entry of a total bid amount. Thus, there exists a price gap between the collection floor price and the bid amount. In order to define individual-item pricing from the collection bid amount, this price gap must be split among the items in the collection, with each price gap portion for an item being added to the item's floor price to arrive at the item's individual price.

The determination of individual-item pricing becomes even more difficult when bids are submitted on behalf of a bidder using an automatic re-bid feature. With such a feature, a bidder may enter criteria in which automatic re-bids may be submitted on his behalf. For instance, in a forward auction, a bidder may enter an initial bid price and a "rebid maximum" (i.e., ceiling) price for purchasing a collection. The rebid maximum price is the highest price that the bidder is willing to pay for purchasing the auction, and an automatic re-bid feature will automatically submit re-bids as necessary, so long as the re-bids are lower than or equal to the rebid maximum price. In a reverse auction, a bidder may enter an initial bid price and a "rebid minimum" (i.e., floor) price for accommodating a request for a collection. The rebid minimum price is the lowest price that the bidder is willing to accept for providing the items in the collection, and an automatic re-bid feature will automatically submit re-bids as necessary, so long as the re-bids are above or equal to the floor price.

Certain properties may be strongly preferred or even mandatory when formulating a strategy for closing a price gap. These properties may include:
(1) fairness to the buyer and the seller,
(2) transparency,
(3) an accurate total price (the total order price must equal a compete price for all possible price inputs),
(4) a feasible price for all price inputs (below or at an initial bid price, and above a floor price), and
(5) data security (difficulty or inability in reverse-engineering the pricing information).

There may be other properties that are desirable, to maximize ease of use, clarity results, and in turn, customer satisfaction. These other properties may include:
(6) indifference to the bundling and indifference to placement on an order list (the final sales prices should be unchanged if several items with the same prices are combined on the same line; also, the prices should be unchanged if two items are swapped),
(7) invariance of price (items with identical unit prices and floor prices should have virtually identical final prices; in particular, the final price for identical items should be identical as possible; for example, the final price for black telephones vs. white telephones should be as identical as possible),
(8) conservation of price ordering (if the unit price and the floor price agree that one item is more costly than another item, then the final sales price should conserve that order), and
(9) minimum computational cost (the strategy should be simple to perform and should execute as fast as possible).

Accordingly, there is a need in the art to process a bid in an auction for a collection of items, and determine individual item pricing for items in the collection. There is also a need in the art to close a price gap between a limit price and a bid-competing price for a collection of items, to determine individual item pricing for items in the collection.

SUMMARY OF THE INVENTION

The present invention addresses the challenges in the art discussed above.

One aspect of the invention relates to an apparatus for computing a bid price for a plurality of items, comprising an input portion adapted to electronically receive (1) a bid for an online auction listing for a plurality of items, the bid including a limit price and an initial bid price for each of the plurality of items, and (2) a total bid price for an entirety of the plurality of items; a processing portion adapted to electronically compute a bid price for each of the plurality of items, wherein a sum of the computed bid prices for the plurality of items is substantially equal to the total bid price; and an output portion adapted to electronically transmit the computed bid prices for the plurality of items to an online auction portion, the online auction portion accepting the bid in accordance with the computed bid prices, wherein said processing portion electronically computes the bid price for each of the plurality of items by performing one or more of: (1) electronically computing a weight for each of the plurality of items, (2) electronically computing a fixed proportion, and (3) electronically computing a price difference between the limit price and the initial bid price for each of the plurality of items, and determining the item of the plurality of items having the smallest price difference, wherein said input portion, said processing portion, and said output portion are implemented using at least one processor and at least one memory.

Another aspect of the invention relates to a method for computing a bid price for a plurality of items, comprising electronically receiving (1) a bid for an online auction listing for a plurality of items, the bid including a limit price and an initial bid price for each of the plurality of items, and (2) a total bid price for an entirety of the plurality of items; electronically computing a bid price for each of the plurality of items, wherein a sum of the computed bid prices for the plurality of items is substantially equal to the total bid price; and electronically transmitting the computed bid prices for the plurality of items to an online auction portion, the online auction portion accepting the bid in accordance with the computed bid prices, wherein said bid price electronic computing step performs one or more of: (1) electronically computing a weight for each of the plurality of items, (2) electronically computing a fixed proportion, and (3) electronically computing a price difference between the limit price and the initial bid price for each of the plurality of items, and determining the item of the plurality of items having the smallest price difference, wherein said electronic receiving step, said bid price electronic computing step, and said electronic transmitting step are implemented using at least one processor and at least one memory.

Yet another aspect of the invention relates to a non-transitory computer-readable storage medium for storing a computer program that computes a bid price for a plurality of items, wherein the computer program, when executed, causes a computer, which includes at least one processor and at least one memory, to perform the steps of electronically receiving (1) a bid for an online auction listing for a plurality of items, the bid including a limit price and an initial bid price for each of the plurality of items, and (2) a total bid price for an entirety of the plurality of items; electronically computing a bid price for each of the plurality of items, wherein a sum of the computed bid prices for the plurality of items is substantially equal to the total bid price; and electronically transmitting the computed bid prices for the plurality of items to an online auction portion, the online auction portion accepting the bid in accordance with the computed bid prices, wherein said bid price electronic computing step performs one or more of: (1) electronically computing a weight for each of the plurality of items, (2) electronically computing a fixed proportion, and (3) electronically computing a price difference between the limit price and the initial bid price for each of the plurality of items, and determining the item of the plurality of items having the smallest price difference.

Further features and advantages, as well as the structure and operation, of various example embodiments of the present invention are described in detail below with reference to the accompanying drawings.

BRIEF DESCRIPTION OF THE DRAWINGS

The features and advantages of the example embodiments of the invention presented herein will become more apparent from the detailed description set forth below when taken in conjunction with the drawings. Like reference numbers between two or more drawings can denote identical or functionally similar elements unless the description indicates otherwise.

FIGS. 4(a) and 4(b) depict a first example of a reverse auction for a collection of items that may be applied to the invention, where FIG. 4(a) is a table containing a seller's bid information in the first example, and FIG. 4(b) is a table showing differences between the seller's floor and initial bid prices and also showing the price gap between a compete price and a total floor price, in the first example.

FIGS. 6(a)-6(c) are tables showing the incremental execution of the first method on the first example, where FIG. 6(a) shows the determination of the bid price of the first item after a first iteration, FIG. 6(b) shows the determination of the bid price for the second item after a second iteration, and FIG. 6(c) shows the determination of the bid prices for the remaining items.

FIGS. 9(a) and 9(b) are tables showing the execution of the second and third methods on the first example, where FIG. 9(a) shows the calculation of the bid price for each item according to the second method by calculating a weight, and FIG. 9(b) shows the calculation of the bid price for each item according to the third method by calculating a fixed proportion value.

FIGS. 11(a) and 11(b) are tables showing the incremental execution of the fourth method on the first example, where FIG. 11(a) shows the determination of the bid price of the first and second items after a first iteration, FIG. 11(b) shows the determination of the bid price of the remaining items.

FIG. 12(a) is a table containing a seller's bid information in a second example of a reverse auction for a collection of items that may be applied to the invention, and FIG. 12(b) is a table showing differences between the seller's floor and initial bid prices and also showing the price gap between a compete price and a total floor price, for the second example.

FIGS. 13(a)-13(d) are tables showing the incremental execution of the first method on the second example, where FIG. 13(a) shows the determination of the bid price of the first item, FIG. 13(b) shows the determination of the bid price for the second item, FIG. 13(c) shows the determination of the bid price for the third item, and FIG. 13(d) shows the determination of the bid price for the fourth item.

FIGS. 14(a) and 14(b) are tables showing the execution of the second and third methods on the second example, where FIG. 14(a) shows the calculation of the bid price for each item according to the second method by calculating a weight, and FIG. 14(b) shows the calculation of the bid price for each item according to the third method by calculating a fixed proportion value.

FIGS. 15(a)-15(c) are tables showing the incremental execution of the fourth method on the second example, where FIG. 15(a) shows the determination of the bid price of the third item after a first iteration, FIG. 15(b) shows the determination of the bid price of the first and second items after a second iteration, and FIG. 15(c) shows the determination of the bid price of the remaining fourth item.

DETAILED DESCRIPTION OF THE INVENTION

Figure 1:
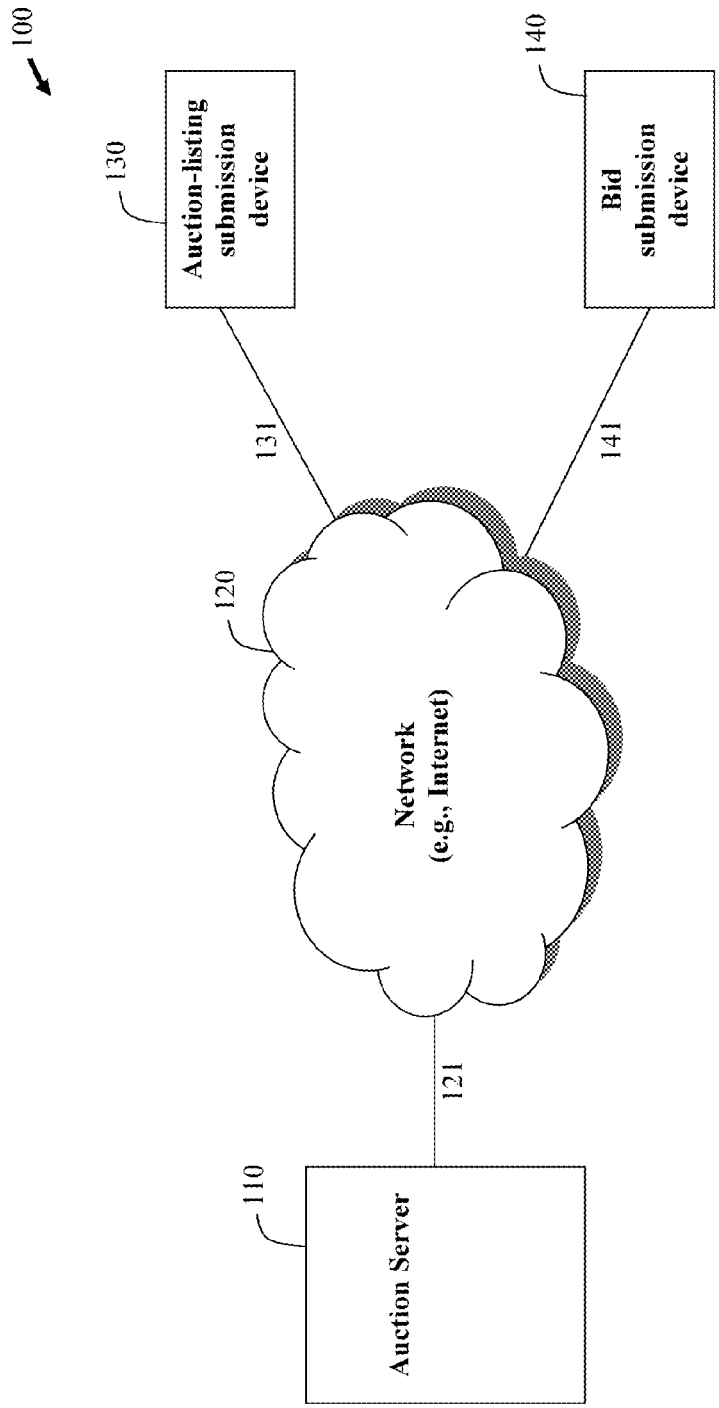
FIG. 1 is a system diagram showing an online auction system according to one aspect of the invention.

FIG. 1 shows an online auction system 100 that may carry out the features of the present invention. Auction system 100 includes an auction server 110. Auction server 110 is connected to a network 120 (such as the Internet) via a network link 121. The auction system 100 also includes at least one auction-listing submission device 130 and at least one bid submission device 140. Auction-listing submission device 130 is connected to network 120 via a network link 131, and bid submission device 140 is connected to network 120 via a network link 141. In a preferred embodiment, auction-listing submission device 130 and bid submission device 140 are personal computers. However, it will be appreciated that the devices may alternatively include cellular telephones (e.g., smartphones), tablets, terminals, or any other devices capable of submitting electronic information to the auction system 100.

Auction-listing submission device 130 is operated by an individual or other entity (e.g., corporate or government) desiring to initiate an auction listing. In the case of a forward auction, the auction listing is for the sale of one or more goods or services, whereas for a reverse auction, the auction listing is a request for the desired purchase of one or more goods or services.

Bid submission device 140 is operated by an individual or other entity (e.g., corporate or government) desiring to submit a bid for the auction listing initiated by an auction-listing submission device 130. In the case of a forward auction, the bid is for the purchase of the one or more goods or services, whereas for a reverse auction, the bid is for the sale of the one or more goods or services, thereby satisfying the request for the desired purchase.

It will be understood that auction system 100 may include multiple auction-listing submission devices 130 and multiple bid submission devices 140, each connected to network 120. It will also be appreciated that any auction-listing submission device 130 and/or bid submission device 140 may communicate with the auction server 110 via a web browser, dedicated software, text messaging, or any other form of data communication.

Figure 2:
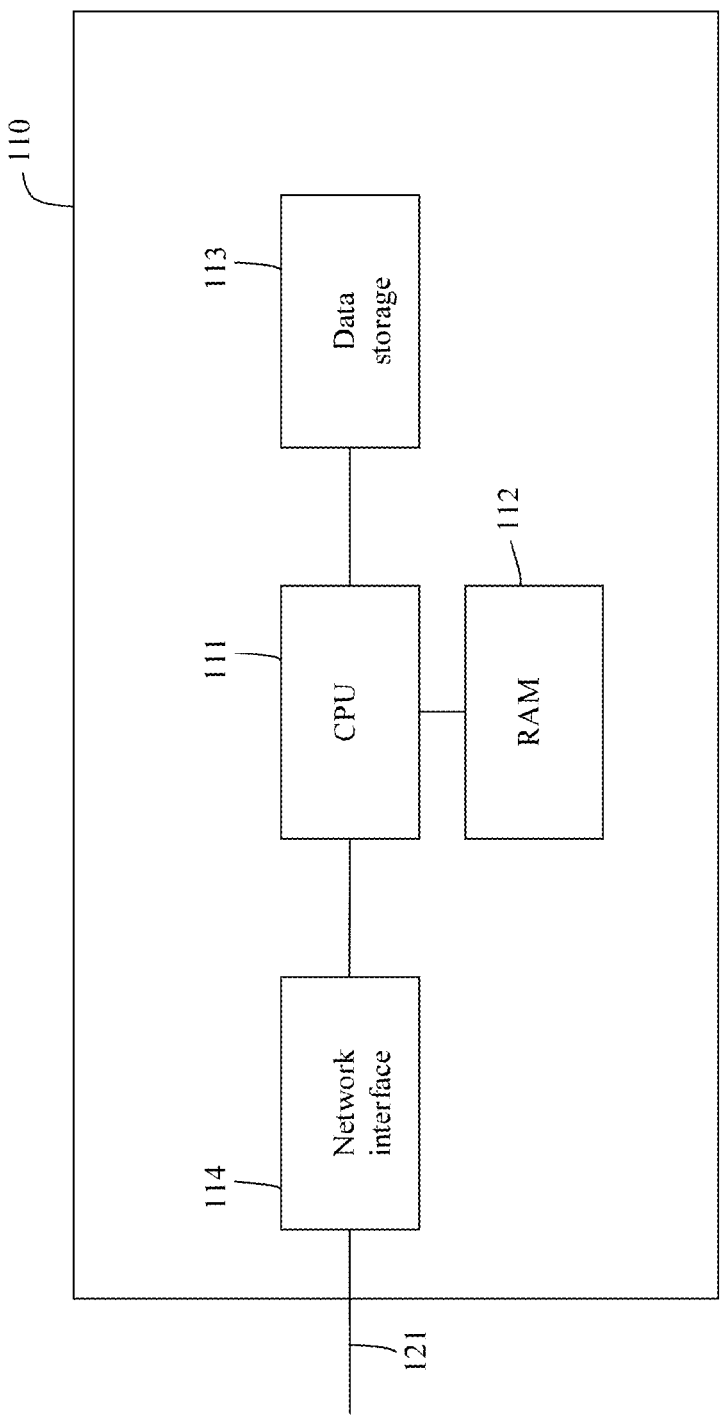
FIG. 2 is a block diagram showing physical components of the auction server according to one aspect of the invention.

FIG. 2 shows various hardware features of auction server 110. Auction server 110 includes a CPU 111, memory 112 (such as RAM), data storage 113 (such as a hard disk or solid state drive), and a network interface 114.

CPU 111 processes instructions stored in memory 112, in accordance with operating system and auction software stored in data storage 113 for execution by auction server 110. Data storage 113 also stores data for the auction software, such as information relating to auction listings, bids, and bidders.

Network interface 114 enables auction server 110 to communicate with network 120 over network link 121.

Figure 3:
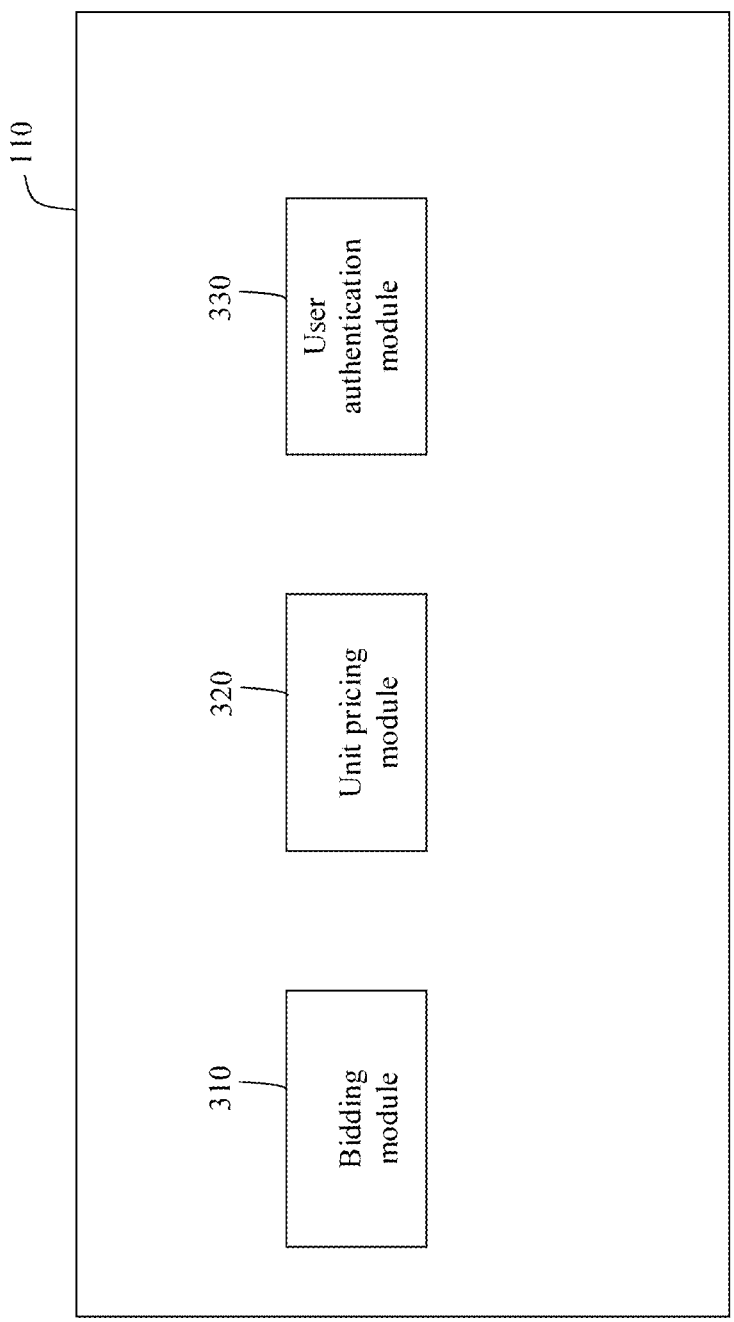
FIG. 3 is a block diagram showing software components running on the auction server according to the same aspect of the invention as illustrated in FIG. 2.

FIG. 3 shows the software modules for the auction software executed on auction server 110. Auction server 110 executes a bidding module 310. Bidding module 310 may include software for conducting an auction, such as accepting an auction listing, accepting bids, and notifying corresponding parties of the auction status and activities. Bidding module 310 may optionally coordinate the exchange of items and funds between the final parties.

Auction server 110 also executes a unit pricing module 320. Unit pricing module 320 accepts a bid involving a collection of items, and determines the appropriate pricing for individual items within the collection, in accordance with one or more of the methods of the invention.

Auction server 110 further executes a user authentication module 330. User authentication module 330 authenticates the operators of auction-listing submission devices 130 and bid submission devices 140. User authentication module 330 thus confirms the identity of the parties involved in an auction.

FIGS. 4(a) and 4(b) show a first example of a bid involving an auction of a collection of items, in a reverse auction configuration. It will be appreciated that the principles of the invention can be equally applied to a forward auction configuration.

In the first example, it is assumed, for example purposes, that the items and their respective quantities have already been set in an active auction by a purchaser. It is further assumed that the price to submit a leading bid (known as a "compete price") at the particular point in the auction is $675. For example, an initial bid from a participating seller (i.e., "opening bid") may have been $850, with a set decrement value of $25, and the current leading bid may be $700. Therefore, a submitted bid of $675 would be placed in the lead. It can be appreciated that the decrements may be implemented as applying either to the opening bid or the current leading bid. For instance, if the decrement is applied to the opening bid, if the current leading bid is $690, a lead bid for submission would still be $675, as $25 decrements are applied to the opening bid of $850.

It can also be appreciated that, particularly at the beginning of an auction, the compete price may alternatively be an initial reserve amount set for the auction. In the case of a reverse auction where bids are solely considered based on pricing, this initial reserve amount may be known as a "buyer target price" established by the buyer, to ensure that any lead bid relative to other bids above this price is not considered a lead bid for purposes of the auction. Of course, it will be appreciated that if a buyer selects other additional criteria for ranking and considering bids, the buyer target price may be simply one of several factors and may not necessarily restrict a bid out of consideration if the bid satisfies other criteria.

As seen in FIG. 4(a), the collection includes four items. The first, second, and fourth items have a quantity of one, while the third item has a quantity of two.

FIG. 4(a) shows the pricings that an example seller has formulated for the collection of items. The seller may have set a "rebid minimum" price for each item. The rebid minimum price is the lowest (i.e., floor) price for which the seller is willing to sell the particular item. That is, the seller is unwilling to sell the item for less than the rebid minimum price. The seller may enter this price as part of an automatic re-bidding feature of the auction system. For such a feature, the auction system may automatically submit re-bids on behalf of the seller as necessary. A seller utilizing this feature is no longer required to continuously monitor the auction status, and remains ensured that as long as the final auction price remains above their re-bid minimum price, this seller will remain in the lead over other bidders. The seller's entry of the rebid minimum price also ensures that automatically generated re-bids do not fall below the rebid minimum price.

The seller may have also set an "inital bid" price for each item. The initial bid price is the highest (goal) price that the seller expects or hopes to sell the item for. As one example, the initial bid price may be the manufacturer's suggested retail price (MSRP) for the item. Of course, the initial bid price can alternatively be any other price contemplated by the seller.

As seen in FIG. 4(a), items #1 and #2 each have a rebid minimum price of $100 and an initial bid price of $150. Item #3 has a rebid minimum price of $110 and an initial bid price of $170. Item #4 has a rebid minimum price of $200 and an initial bid price of $290.

FIG. 4(b) shows the amounts broken down according to each unit within the collection, along with the calculation of the differences between the rebid minimum and initial bid prices. As seen in FIG. 4(b), items #1 and #2 each have a difference of $50 per unit and $50 total. Item #3 has a difference of $60 per unit and $120 total. Item #4 has a difference of $90 per unit and $90 total.

FIG. 4(b) also shows the total rebid minimum price for the entire collection is $620, while the total initial bid price for the entire collection is $930.

As explained above, the compete price for a leading bid in the first example is $675. Therefore, price gaps exist between the $675 prospective bid and both (1) the rebid minimum total price of $620 and (2) the initial bid total price of $930. For illustrative purposes, the price gap between the rebid minimum total price and the prospective bid (i.e., compete price) will be explained. However, it will be appreciated that the price gap between the initial bid total price and the prospective bid may be equally relevant and substitutable.

A $55 price gap ($675-$620) exists between the rebid minimum total price and the prospective bid price. Upon the seller submitting a $675 bid for the collection, this price gap is inevitably distributed (or "closed") among the individual items. However, different methods may be used to accomplish this task and assign fair prices to the individual items. The resulting pricing structure from executing each of these methods may vary.

Figure 5:
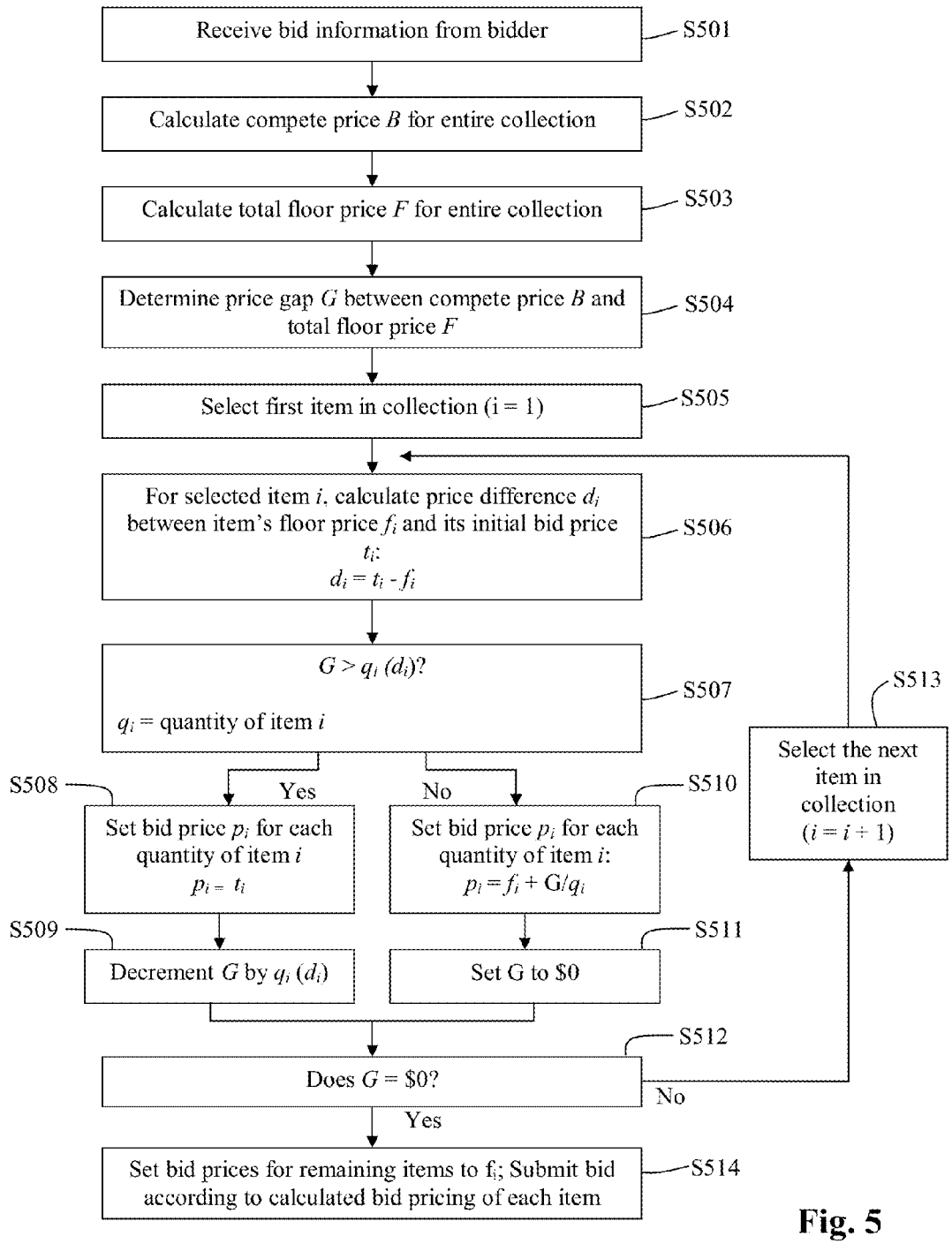
FIG. 5 is a flow-chart with steps for implementing a first method for closing a price gap.

FIG. 5 shows a first method of closing a price gap between a compete price and a floor price, and calculating fair sales prices for individual items within a collection. The steps in FIG. 5 are applicable to an initial bid or an automatic re-bid for a pending auction. This particular method for closing the price gap may also be referred to as a "greedy" method.

In step S501, the auction server 110 receives bid information from a bidder.

In step S502, the auction server 110 calculates a compete price B for the entire collection. In the first example shown in FIG. 4, the compete price is $675.

In step S503, the auction server 110 calculates a total floor price F for the entire collection. In the first example shown in FIG. 4, the total floor price F is $620.

In step S504, the auction server 110 determines the price gap G between the compete price B and the total floor price F. In the first example of FIG. 4, the price gap G is $55.

In step S505, the auction server 110 selects the first item in the collection. In the first example shown in FIG. 4, the first item is item #1.

In step S506, the auction server 110, for a selected item i, calculates a price difference $d_i$ between the selected item's floor price $f_i$ and the selected item's initial bid price $t_i$. That is, $d_i = t_i - f_i$. Note that the price difference $d_i$ is for a single quantity of item i. In the first example as shown in FIG. 4(b), $d_1 = \$50$, $d_2 = \$50$, $d_3 = \$60$, and $d_4 = \$90$, for items #1 through #4, respectively.

In step S507, the auction server 110 determines whether the remaining price gap G is greater than the total-quantity price difference for item i. The total-quantity price difference $q_i (d_i)$ is determined by multiplying the single-quantity price difference $d_i$ by the quantity $q_i$ of item i. In the first example as shown in FIG. 4(b), items #1 and #2 each have a total-quantity price difference of $50, item #3 has a total-quantity price difference of $120, and item #4 has a total-quantity price difference of $90.

If the remaining price gap G is greater than the total-quantity price difference $q_i (d_i)$ for item i, item i is not sufficient to close the remaining price gap G. Therefore, the auction server 110 proceeds to step S508.

In step S508, the auction server 110 sets the bid price $p_i$ for each quantity of item i to the initial bid price $t_i$.

In step S509, the auction server 110 decrements the price gap G by the total-quantity price difference $q_i (d_i)$ for the item i, where $q_i$ is the quantity of item i. That is, by raising the effective selling price for item i to the initial bid price $t_i$ in step S508, the auction server 110 applies the entire price difference for item i to reducing the price gap G.

If the auction server 110 determines in step S507 that the remaining price gap G is less than or equal to the total-quantity price difference $q_i (d_i)$ for item i, the auction server 110 proceeds to step S510.

In step S510, the auction server 110 sets the bid price $p_i$ for each quantity of item i to a price that fully satisfies the remaining price gap G. To accomplish this result, $p_i$ is set as $f_i + G/q_i$. That is, the price gap G is fully closed when the total-quantity price difference for item i is equal to or greater than the remaining price gap G, and the total-quantity price difference is used to fully satisfy the price gap G.

In step S511, the auction server 110 sets the price gap G to $0, as item i successfully closed the remainder of the price gap G.

After completing steps S509 or S511, the auction server 110 proceeds to step S512. In step S512, the auction server 110 determines whether the price gap G has been fully closed (i.e., if G=$0).

If the price gap G has not been fully closed, the auction server 110 proceeds to step S513. In step S513, the auction server 110 selects the next item i in the collection and returns to step S506.

If the price gap G has been fully closed in step S512, the auction server 110 proceeds to step S514. In step S514, the auction server 110 sets the bid prices $p_i$ for all remaining items i in the collection to their respective floor prices $f_i$. The auction server 110 then submits the bid according to the calculated bid prices $p_i$ for each item i, as either an initial bid or an automatic re-bid, depending on the circumstances.

FIG. 6 shows the execution of steps S505-S514 in FIG. 5 with the first example shown in FIG. 4. As seen in FIG. 6(a), step S505 first selects item #1. Steps S507 and S508 calculate the per-unit price difference $d_1$ as $50 and the total-quantity price difference $q_1$ ($d_1$) as $50. As the price gap of $55 is greater than the total-quantity price difference of $50, steps S508 and S509 are executed.

Step S508 sets the bid price $p_1$ to the initial bid price of $150. Step S509 decrements the price gap G by the total-quantity price difference for item #1 of $50. The price gap G is now $5.

Step S512 determines that the price gap G is not yet $0, and step S513 selects item #2. As seen in FIG. 6(b), Steps S507 and S508 calculate the per-unit price difference $d_2$ as $50 and the total-quantity price difference $q_2$ ($d_2$) as $50. As the price gap of $5 is not greater than the total-quantity price difference of $50, steps S510 and S511 are executed. Step S510 calculates the bid price $p_2$ to be $100+$5/1=$105. Step S511 sets the price gap G to $0.

As step S512 determines that the price gap G is now $0, step S514 sets the bid prices $p_i$ for all remaining items to their floor price $f_i$. Therefore, seen in FIG. 6(c), the bid price $p_3$ for item #3 is set to $110 each, and the bid price $p_4$ for item #4 is set to $200.

It is noted that the first method of closing a price gap satisfies properties (1)-(5) and (9) but fails properties (6)-(8), as listed above.

Figure 7:
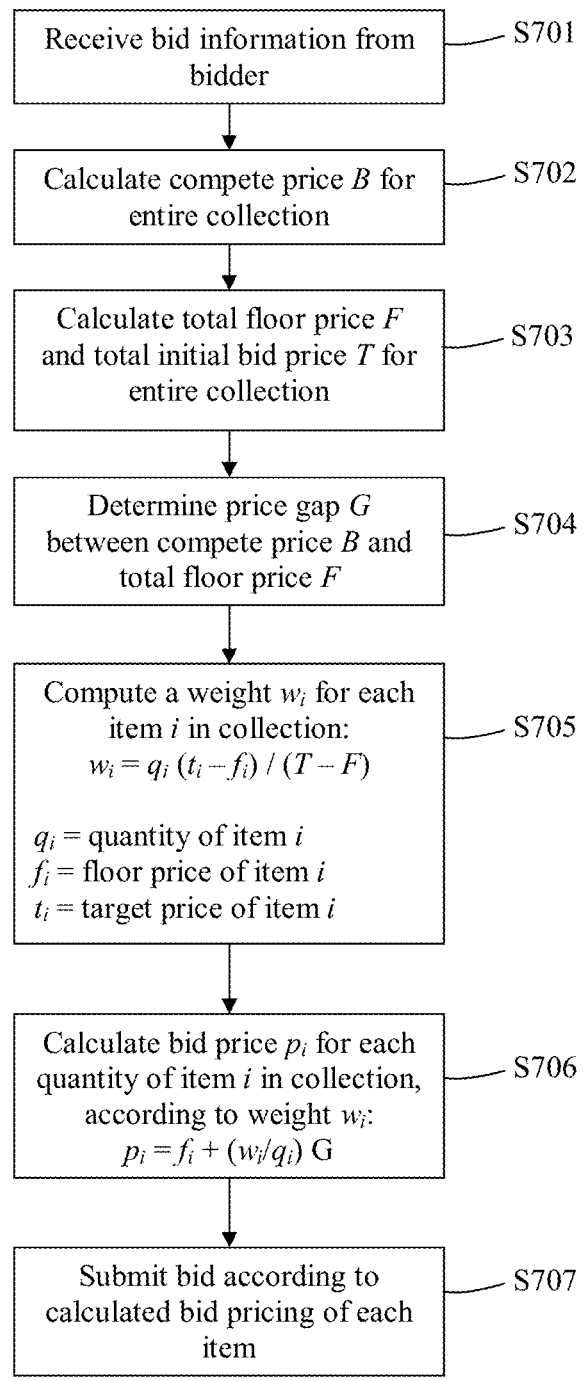
FIG. 7 is a flow-chart with steps for implementing a second method for closing a price gap.

FIG. 7 shows a second method of closing a price gap between a compete price and a floor price, and calculating fair sales prices for individual items within a collection. Like the steps of FIG. 5, the steps in FIG. 7 are applicable to an initial bid or an automatic re-bid for a pending auction. This particular method for closing the price gap may also be referred to as a "weight-based best-value" method.

In step S701, the auction server 110 receives bid information from a bidder.

In step S702, the auction server 110 calculates a compete price B for the entire collection. In the first example shown in FIG. 4, the compete price is $675.

In step S703 the auction server 110 calculates a total floor price F and a total initial bid price T for the entire collection. In the first example shown in FIG. 4, the total floor price F is $620, and the total initial bid price T is $930.

In step S704, the auction server 110 determines the price gap G between the compete price B and the total floor price F. In the first example shown in FIG. 4, the price gap G is $55.

In step S705, the auction server 110 computes a weight $w_i$ for each item i in the collection. The weight $w_i$ corresponds to the proportion of the price gap that should be accounted for by item i. The weight $w_i$ is calculated as $q_i(t_i-f_i)/(T-F)$, where $q_i$ is the quantity of item i, $f_i$ is the floor price of item i, and $t_i$ is the initial bid price of item i.

Then, in step S706, the auction server 110 calculates the bid price $p_i$ for each item i, according to the item's weight $w_i$. The bid price $p_i$ is set as $f_i+(w_i/q_i)G$, that is, the weighted portion of the price gap G added to the floor price $f_i$ for item i.

In step S707, the auction server 110 submits the bid according to the calculated bid prices $p_i$ for each item i, as either an initial bid or an automatic re-bid, depending on the circumstances.

Figure 8:
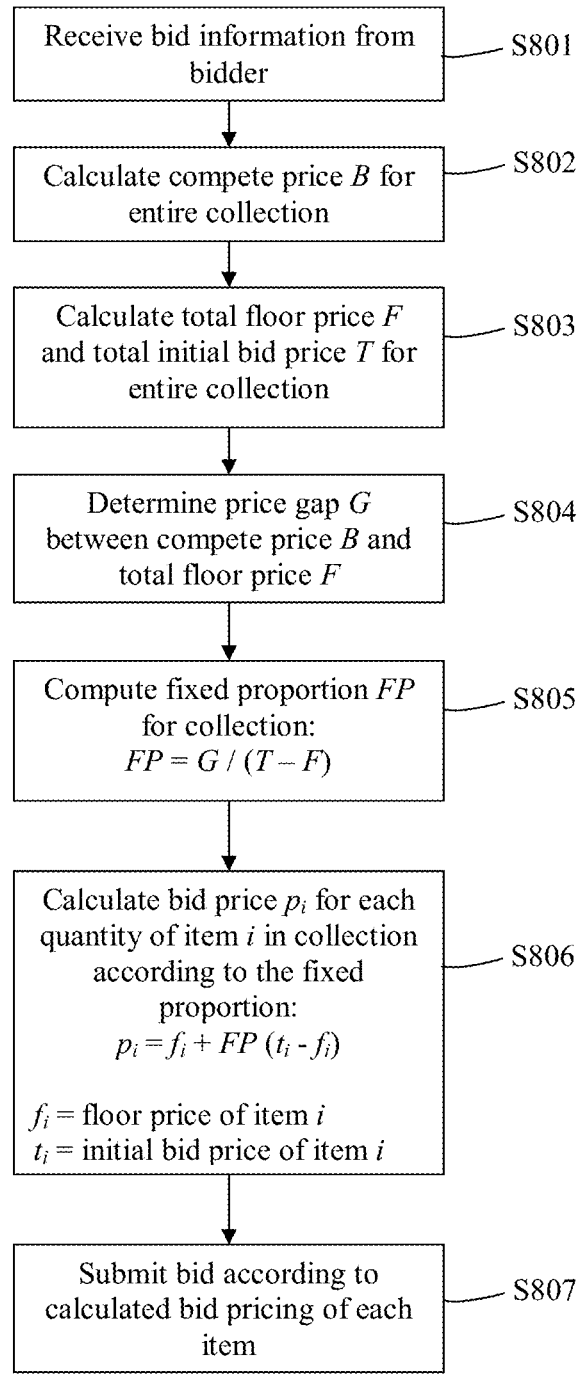
FIG. 8 is a flow-chart with steps for implementing a third method for closing a price gap.

FIG. 8 shows a third method of closing a price gap between a compete price and a floor price, and calculating fair sales prices for individual items within a collection. Like the steps of FIGS. 5 and 7, the steps in FIG. 8 are applicable to an initial bid or an automatic re-bid for a pending auction. This particular method for closing the price gap may also be referred to as a "fixed-proportion-based best-value" method.

In step S801, the auction server 110 receives bid information from a bidder.

In step S802, the auction server 110 calculates a compete price B for the entire collection. In the first example shown in FIG. 4, the compete price is $675.

In step S803, the auction server 110 calculates a total floor price F and a total initial bid price T for the entire collection. In the first example shown in FIG. 4, the total floor price F is $620, and the total initial bid price T is $930.

In step S804, the auction server 110 determines the price gap G between the compete price B and the total floor price F. In the first example shown in FIG. 4, the price gap G is $55.

In step S805, the auction server 110 computes a fixed proportion FP for the collection. FP is calculated as G/(T−F). In effect, the fixed proportion FP is the gap divided by the difference between the total initial bid price and the total floor price.

In step S806, the auction server 110 calculates the bid price $p_i$ for each item i, according to the fixed proportion FP. The bid price $p_i$ is set as $f_i+FP(t_i-f_i)$, that is, the fixed proportion multiplied by the item's price difference, added to the floor price $f_i$ for item i.

In step S807, the auction server 110 submits the bid according to the calculated bid prices $p_i$ for each item i, as either an initial bid or an automatic re-bid, depending on the circumstances.

The weight-based best-value approach of FIG. 7 and the fixed-proportion-based best-value approach of FIG. 8 both calculate identical prices $p_i$ for each item i. However, the fixed-proportion-based approach is slightly more computationally efficient. There are two reasons behind this.

First, the computation of the weights in the weight-based approach requires multiplying by the quantity $q_i$ and later dividing out the quantity $q_i$. In actuality, the quantity $q_i$ is not required to compute the price $p_i$ for an item i. Second, the fixed-proportion-based approach requires only a single calculation to determine the fixed proportion FP, while the weight-based approach requires a calculation for each item i to determine its respective $w_i$.

It is noted that the weight-based best-value approach of FIG. 7 and the fixed-proportion-based best-value approach of FIG. 8 satisfies properties (1)-(9), as listed above.

FIG. 9(a) and FIG. 9(b) show the application of the steps in FIG. 7 and FIG. 8, respectively, using the first example of FIG. 4.

FIG. 9(a) shows the application of the weight-based best-value method in FIG. 7. As mentioned above, in steps S702-S704, the total floor price F is calculated as $620, the total initial bid price T is calculated as $930, and the price gap G is calculated as $55. In step S705, the weights $w_1$ through $w_4$ are calculated, as shown in FIG. 9(a). Next, in step S706, the bid price $p_i$ is calculated for each item from their respective weights, as also shown in the right column of FIG. 9(a). Finally, in step S707, the auction server 110 submits the bid according to the calculated bid prices.

FIG. 9(b) shows the application of the fixed-proportion-based method in FIG. 8. As mentioned above, in steps S802-S804, the total floor price F is calculated as $620, the total initial bid price T is calculated as $930, and the price gap G is calculated as $55. In step S805, the fixed proportion FP is calculated as G/(T−F)=$55/($930−$620)=0.177. In step S806, the bid price $p_i$ is calculated for each item using the fixed proportion FP, as shown in the right column of FIG. 9(b). Finally, in step S807, the auction server 110 submits the bid according to the calculated bid prices.

Figure 10:
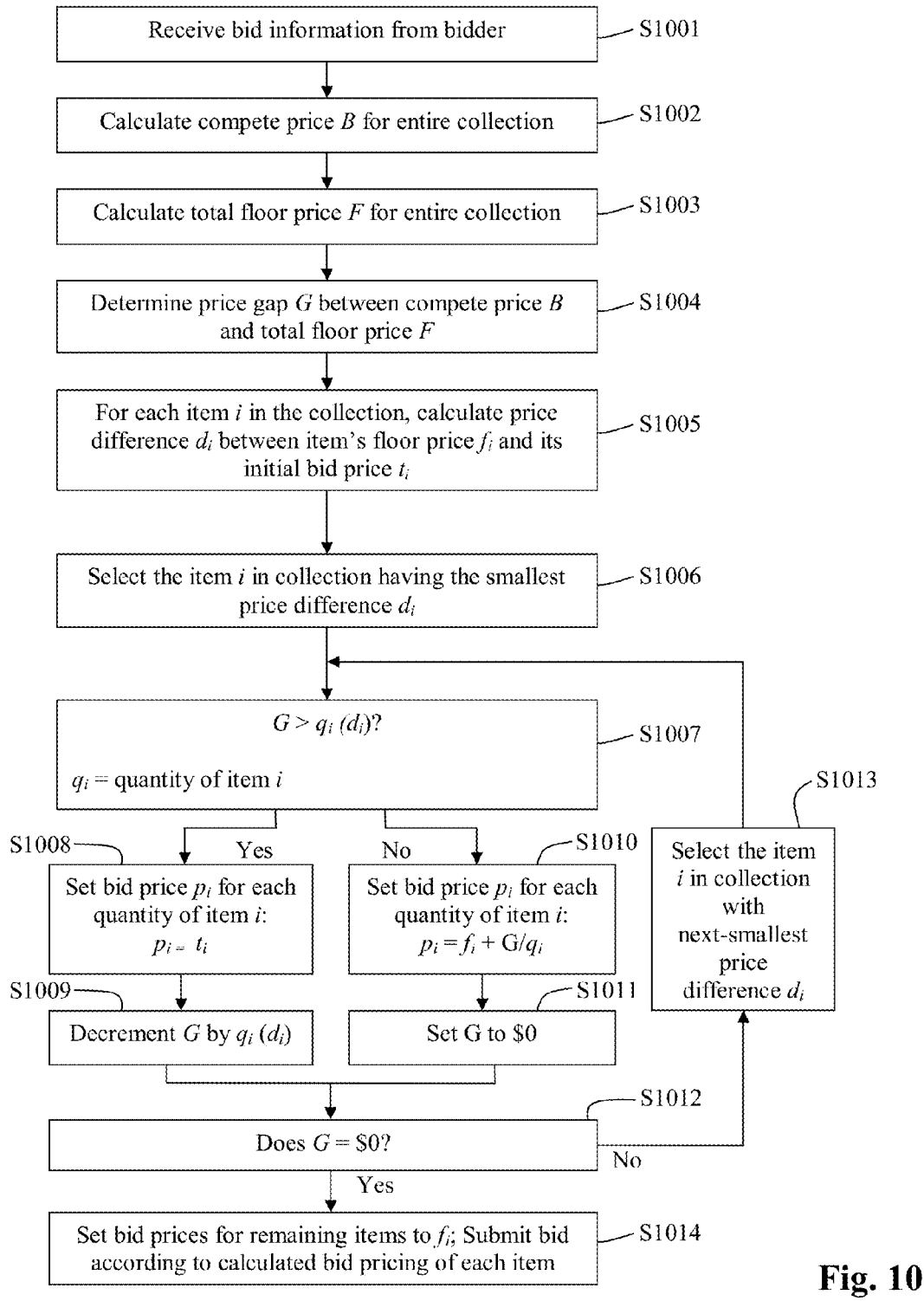
FIG. 10 is a flow-chart with steps for implementing a fourth method for closing a price gap.

FIG. 10 shows a fourth method of closing a price gap between a compete price and a floor price, and calculating fair sales prices for individual items within a collection. Like the steps of FIGS. 5, 7, and 8, the steps in FIG. 10 are applicable to an initial bid or an automatic re-bid for a pending auction. This particular method for closing the price gap may also be referred to as a "best-value" method, but in a different manner. In particular, this method is similar to the first "greedy" method, but selects items in an order that minimizes changes in pricing of each item. That is, the method recognizes that price increases for items having a relatively small price difference between their floor price and their initial bid price and will cause a relatively small impact compared to price increases for items having a larger price difference.

In step S1001, the auction server 110 receives bid information from a bidder.

In step S1002, the auction server 110 calculates a compete price B for the entire collection. In the first example shown in FIG. 4, the compete price is $675.

In step S1003, the auction server 110 calculates a total floor price F and a total initial bid price T for the entire collection. In the first example shown in FIG. 4, the total floor price F is $620, and the total initial bid price T is $930.

In step S1004, the auction server 110 determines the price gap G between the compete price B and the total floor price F. In the first example shown in FIG. 4, the price gap G is $55.

In step S1005, the auction server 110 calculates, for every item i, the price difference $d_i$ between the item's floor price $f_i$ and its initial bid price $t_i$.

In step S1006, the auction server 110 selects the item i within the collection which has the smallest price difference $d_i$. If there are multiple such items having the identical smallest price difference (i.e., a tie), they are jointly selected and combined. That is, if there is a tie for the smallest price difference, all of the tied items participate in the iterative step.

In step S1007, the auction server 110 determines whether the remaining price gap G is greater than the total-quantity price difference for item i. The total-quantity price difference for item i is calculated as $q_i$ $(d_i)$, where $q_i$ is the quantity of item i.

If the remaining price gap G is greater than the total-quantity price difference $q_i$ $(d_i)$ for item i, item i is not sufficient to close the remaining price gap G. Therefore, the auction server 110 proceeds to step S1008.

In step S1008, the auction server 110 sets the bid price $p_i$ of each quantity of item i as the initial bid price $t_i$. In step S1009, the auction server 110 decrements the price gap G by the total-quantity price difference $q_i(d_i)$.

If the auction server 110 determines in step S1007 that the remaining price gap G is less than or equal to the total-quantity price difference $q_i$ $(d_i)$ for item i, the auction server 110 proceeds to step S1010.

In step S1010, the auction server 110 sets the bid price $p_i$ for each quantity of item i to a price that fully satisfies the remaining price gap G. To accomplish this result, $p_i$ is set as $f_i$+G/$q_i$. That is, the price gap G is fully closed when the total-quantity price difference for item i is equal to or greater than the remaining price gap G, and the total-quantity price difference is used to fully satisfy the price gap G.

In step S1011, the auction server 110 sets the price gap G to $0, as item i successfully closed the remainder of the price gap G.

After completing steps S1009 or S1011, the auction server 110 proceeds to step S1012. In step S1012, the auction server 110 determines whether the price gap G has been fully closed (i.e., if G=$0).

If the price gap G has not been fully closed, the auction server 110 proceeds to step S1013. In step S1013, the auction server 110 advances to the next item i in the collection having the next smallest price difference $d_i$ and returns to step S1007.

If the price gap G has been fully closed in step S1012, the auction server 110 proceeds to step S1014. In step S1014, the auction server 110 sets the bid prices $p_i$ for all remaining items i in the collection to their respective floor prices $f_i$. The auction server 110 then submits the bid according to the calculated bid prices $p_i$ for each item i, as either an initial bid or an automatic re-bid, depending on the circumstances.

It is noted that the fourth method of closing the price gap satisfies properties (1)-(7) and (9), as listed above.

FIGS. 11(a) and 11(b) show the execution of steps S1005-S1014 in FIG. 10, using the first example of FIG. 4. As seen in FIG. 11(a), step S1005 calculates the price difference between each item's floor price and its initial bid price. Items #1 and #2 have a per-unit price difference of $50, item #3 has a per-unit price difference of $60, and item #4 has a per-unit price difference of $90. Step S1006 is then executed, which jointly selects items #1 and #2. This occurs because items #1 and #2 both have a per-unit price difference of $50 while the remaining items have a higher per-unit price difference. Step S1007 determines that the price gap G of $55 is not higher than the joint total-quantity price difference for items #1 and #2 of $100 (i.e., $50+$50). Thus, steps S1010 and S1011 are executed.

Step S1010 calculates the bid prices $p_1$ and $p_2$ to be $100+$55/2=$127.50. Step S1011 sets the price gap G to $0.

As step S1012 determines that the price gap G is now $0, step S1014 sets the bid prices $p_i$ for all remaining items to their floor price $f_i$. Therefore, as seen in FIG. 11(b), the bid price $p_3$ for item #3 is set to $110 each, and the bid price $p_4$ for item #4 is set to $200.

FIGS. 12(a) and 12(b) show a second example of a bid involving an auction of a collection of items, in a reverse auction configuration. It will be appreciated that like the first example, the principles of the invention can be equally applied to a forward auction configuration.

As in the first example, it is assumed in the second example, for example purposes, that the items and their respective quantities have already been set in an active auction by a purchaser. It is further assumed that the price to submit a leading bid (known as a "compete" price) at the particular point in the auction is $1180. For example, an opening bid may have been $1300, with a set decrement value of $20, and the current bid may be $1200. Therefore, a submitted bid of $1180 would be placed in the lead.

As seen in FIG. 12(a), the collection includes four items. The first and fourth items have a quantity of one, the second item has a quantity of three, and the third item has a quantity of two.

FIG. 12(a) shows the pricings that an example seller has formulated for the collection of items, similar to FIG. 4(a)

for the first example. As seen in FIG. 12(a), items #1 and #2 each have a rebid minimum price of $100 and an initial bid price of $170. Item #3 has a rebid minimum price of $110 and an initial bid price of $160. Item #4 has a rebid minimum price of $200 and an initial bid price of $290.

FIG. 12(b) shows the amounts broken down according to each unit within the collection, along with the calculation of the differences between the rebid minimum and initial bid prices. As seen in FIG. 12(b), item #1 has a difference of $70 per unit and $70 total. Item #2 has a difference of $70 per unit and $210 total. Item #3 has a difference of $50 per unit and $100 total. Item #4 has a difference of $90 per unit and $90 total.

FIGS. 13(a)-13(d) shows the execution of steps S505-S514 in FIG. 5 with the second example shown in FIGS. 12(a) and 12(b). As seen in FIG. 13(a), step S505 first selects item #1. Steps S507 and S508 calculate the per-unit price difference $d_1$ as $70 and the total-quantity price difference $q_1$ ($d_1$) as $70. As the price gap of $360 is greater than the total-quantity price difference of $70, steps S508 and S509 are executed.

Step S508 sets the bid price $p_1$ to the initial bid price of $170. Step S509 decrements the price gap G by the total-quantity price difference for item #1 of $70. The price gap G is now $290.

Step S512 determines that the price gap G is not yet $0, and step S513 selects item #2. As seen in FIG. 13(b), steps S507 and S508 calculate the per-unit price difference $d_2$ as $70 and the total-quantity price difference $q_2$ ($d_2$) as $210. As the price gap of $290 is greater than the total-quantity price difference of $210, steps S508 and S509 are again executed. Step S508 sets the bid price $p_2$ to the initial bid price of $170. Step S509 decrements the price gap G by the total-quantity price difference for item #2 of $210. The price gap G is now $80.

Step S512 again determines that the price gap G is not yet $0, and step S513 selects item #3. As seen in FIG. 13(c), steps S507 and S508 calculate the per-unit price difference $d_3$ as $50 and the total-quantity price difference $q_3$ ($d_3$) as $100. As the price gap of $80 is not greater than the total-quantity price difference of $100, steps S510 and S511 are executed. Step S510 calculates the bid price $p_3$ to be $110+$80/2=$150. Step S511 sets the price gap G to $0.

As step S512 determines that the price gap G is now $0, step S514 sets the bid prices $p_i$ for all remaining items to their floor price $f_i$. Therefore, seen in FIG. 13(d), the bid price $p_4$ for item #4 is set to $200.

FIG. 14(a) and FIG. 14(b) show the application of the steps in FIG. 7 and FIG. 8, respectively, using the second example of FIG. 12.

FIG. 14(a) shows the application of the weight-based best-value method in FIG. 7. In steps S702-S704, the total floor price F is calculated as $820, the total initial bid price T is calculated as $1290, and the price gap G is calculated to be $360. In step S705, the weights $w_i$ through $w_4$ are calculated, as shown in FIG. 14(a). Then in step S706, the bid price $p_i$ is calculated for each item, as also shown in the right column of FIG. 14(a).

FIG. 14(b) shows the application of the fixed-proportion-based method in FIG. 8. In steps S802-S804, the total floor price F is calculated as $820, the total initial bid price T is calculated as $1290, and the price gap G is calculated as $360. In step S805, the fixed proportion FP is calculated as G/(T−F)=$360/($1290−$820)=0.766.

In step S806, the fixed proportion FP is applied to calculate the bid price $p_i$ for each item, as shown in the right column of FIG. 14(b).

FIG. 15(a)-(c) show the application of the application of the steps in FIG. 10, using the second example of FIG. 12. As seen in FIG. 15(a), step S1005 calculates the price difference between each item's floor price and its initial bid price. Items #1 and #2 have a per-unit price difference of $70, item #3 has a per-unit price difference of $50, and item #4 has a per-unit price difference of $90. Step S1006 is then executed, which selects item #3. This occurs because item #3 has a per-unit price difference of $50 while the remaining items have a higher per-unit price difference. Step S1007 determines that the price gap G of $360 is higher than the total-quantity price difference for item #3 of $70. Thus, steps S1008 and S1009 are executed.

Step S1008 sets the bid price $p_3$ to the initial bid price of $160. Step S509 decrements the price gap G by the total-quantity price difference for item #3 of $100. The price gap G is now $260.

Step S1012 determines that the price gap G is not yet $0, and step S1013 next jointly selects items #1 and #2. This occurs because items #1 and #2 both have a per unit price difference of $70 while the remaining item #4 has a higher per-unit price difference. As seen in FIG. 15(b), step S1007 determines that the price gap G of $260 is not higher than the joint total-quantity price difference for items #1 and #2 of $280 ($70+$210). Thus, steps S1010 and S1011 are executed.

Step S1010 calculates the bid prices $p_1$ and $p_2$ to be $100+$260/4=$165. Step S1011 sets the price gap G to $0.

As step S1012 determines that the price gap G is now $0, step S1014 sets the bid prices $p_i$ for remaining item #4 to its floor price $f_i$. Therefore, as seen in FIG. 15(c), the bid price $p_4$ for item #4 is set to $200.

In the foregoing description, example aspects of the present invention are described with reference to specific example embodiments. Despite these specific embodiments, many additional modifications and variations would be apparent to those skilled in the art. Thus, it is to be understood that example embodiments of the invention may be practiced in a manner other than those specifically described. Accordingly, the specification is to be regarded in an illustrative rather than restrictive fashion. It will be evident that modifications and changes may be made thereto without departing from the broader spirit and scope.

Similarly, it should be understood that the figures are presented solely for example purposes. The architecture of the example embodiments presented herein is sufficiently flexible and configurable such that it may be practiced in ways other than that shown in the accompanying figures.

Furthermore, the purpose of the foregoing abstract is to enable the U.S. Patent and Trademark Office, the general public, and scientists, engineers, and practitioners in the art who are unfamiliar with patent or legal terms or phrases, to quickly determine from a cursory inspection the nature and essence of the technical disclosure of the application. The abstract is not intended to limit the scope of the present invention in any way. It is also to be understood that the processes recited in the claims need not be performed in the order presented.

What is claimed is:

1. An online auction system that computes a bid price for each one of a plurality of different items within an online auction listing, comprising:
a bidding portion, adapted to:
electronically receive a request for an online auction listing for a plurality of different items, the plurality of different items including a first item and a second item different from the first item, electronically create the online auction listing corresponding to the request,
electronically receive, from a user, an initial bid for the online auction listing, the initial bid including:
  a limit price for the first item,
  an initial bid price for the first item,
  a limit price for the second item,
  an initial bid price for the second item, and
  a limit price and an initial bid price for each remaining one of the plurality of different items within the online auction listing,
electronically compute, based on the initial bid prices for the plurality of different items, an initial total bid price for an entirety of the plurality of different items,
electronically generate an updated bid in response to a change in status of the online auction listing, wherein the updated bid includes an updated total bid price for the entirety of the plurality of different items of the online auction listing but does not include updated bid prices for individual different items of the online auction listing, and
electronically determine a winning bid corresponding to the online auction listing, the winning bid including:
  a sale price for the first item,
  a sale price for the second item, and
  a sale price for each remaining one of the plurality of different items within the online auction listing; and
a unit pricing portion, adapted to:
  electronically compute, for the user's updated bid, an updated bid price for the first item, an updated bid price for the second item, and an updated bid price for each remaining one of the plurality of different items, the updated bid price for each respective item electronically computed by electronically computing a weight for the respective item in accordance with the limit price and the initial bid price for the respective item from the user's initial bid, wherein a sum of the computed updated bid prices for the entirety of the plurality of different items is equal to the updated total bid price, and
  electronically transmit the computed updated bid prices for the plurality of different items to said bidding portion, wherein said bidding portion electronically receives the computed updated bid prices and electronically accepts the user's updated bid for the online auction listing by accepting each individual computed updated bid price for each respective item within the online auction listing,
wherein said bidding portion and said unit pricing portion are implemented using at least one processor and at least one memory.

2. An apparatus according to claim 1, wherein the limit price for each of the plurality of different items is a floor price.

3. An apparatus according to claim 1, wherein the initial bid price for each of the plurality of different items is a price that a corresponding bidder has set as a goal.

4. An online auction system that computes a bid price for each one of a plurality of different items within an online auction listing, comprising:
a bidding portion, adapted to:
  electronically receive a request for an online auction listing for a plurality of different items, the plurality of different items including a first item and a second item different from the first item,
  electronically create the online auction listing corresponding to the request,
  electronically receive, from a user, an initial bid for the online auction listing, the initial bid including:
    a limit price for the first item,
    an initial bid price for the first item,
    a limit price for the second item,
    an initial bid price for the second item, and
    a limit price and an initial bid price for each remaining one of the plurality of different items within the online auction listing,
  electronically compute, based on the initial prices for the plurality of different items, an initial total bid price for an entirety of the plurality of different items,
  electronically generate an updated bid in response to a change in status of the online auction listing, wherein the updated bid includes an updated total bid price for the entirety of the plurality of different items of the online auction listing but does not include updated bid prices for individual different items of the online auction listing, and
  electronically determine a winning bid corresponding to the online auction listing, the winning bid including:
    a sale price for the first item,
    a sale price for the second item, and
    a sale price for each remaining one of the plurality of different items within the online auction listing; and
a unit pricing portion, adapted to:
  electronically compute, for the user's updated bid, an updated bid price for the first item, an updated bid price for the second item, and an updated bid price for each remaining one of the plurality of different items, wherein:
    (1) a fixed proportion corresponding to the updated bid is electronically computed in accordance with the limit prices and the initial bid prices for the plurality of different items from the user's initial bid,
    (2) the updated bid price for each respective item is electronically computed in accordance with:
      (a) the limit price for the respective item from the user's initial bid,
      (b) the initial bid price for the respective item from the user's initial bid, and
      (c) the fixed proportion, and
    (3) a sum of the computed updated bid prices for the entirety of the plurality of different items is equal to the updated total bid price, and
  electronically transmit the computed updated bid prices for the plurality of different items to said bidding portion, wherein said bidding portion electronically receives the computed updated bid prices and electronically accepts the user's updated bid for the online auction listing by accepting each individual computed updated bid price for each respective item within the online auction listing,
wherein said bidding portion and said unit pricing portion are implemented using at least one processor and at least one memory.

5. An apparatus according to claim 4, wherein the limit price for each of the plurality of different items is a floor price.

6. An apparatus according to claim 4, wherein the initial bid price for each of the plurality of different items is a price that a corresponding bidder has set as a goal.

7. An apparatus according to claim 4, wherein said unit pricing portion electronically computes the bid price for each one of the plurality of different items by:
(1) electronically computing the fixed proportion in accordance with:
  (a) the updated total bid price,
  (b) a sum of the limit prices for the plurality of different items from the user's initial bid, and
  (c) a sum of the initial bid prices for the plurality of different items from the user's initial bid, and
(2) for each respective item, applying the fixed proportion to the respective item.

8. An online auction system that computes a bid price for each one of a plurality of different items within an online auction listing, comprising:
a bidding portion, adapted to:
  electronically receive a request for an online auction listing for a plurality of different items, the plurality of different items including a first item and a second item different from the first item,
  electronically create the online auction listing corresponding to the request,
  electronically receive, from a user, an initial bid for the online auction listing, the initial bid including:
    a limit price for the first item,
    an initial bid price for the first item,
    a limit price for the second item,
    an initial bid price for the second item, and
    a limit price and an initial bid price for each remaining one of the plurality of different items within the online auction listing,
  electronically compute, based on the initial bid prices for the plurality of different items, an initial total bid price for an entirety of the plurality of different items,
  electronically generate an updated bid in response to a change in status of the online auction listing, wherein the updated bid includes an updated total bid price for the entirety of the plurality of different items of the online auction listing but does not include updated bid prices for individual different items of the online auction listing, and
  electronically determine a winning bid corresponding to the online auction listing, the winning bid including:
    a sale price for the first item,
    a sale price for the second item, and
    a sale price for each remaining one of the plurality of different items within the online auction listing; and
a unit pricing portion, adapted to:
  electronically compute, for the user's updated bid, an updated bid price for the first item, an updated bid price for the second item, and an updated bid price for each remaining one of the plurality of different items, wherein:
    (1) the updated bid prices for the plurality of different items are electronically computed by:
      (a) electronically computing a price difference between the limit price and the initial bid price for each one of the plurality of different items, and
      (b) determining the item, out of the plurality of different items, which has the smallest computed price difference, and
    (2) a sum of the computed updated bid prices for the entirety of the plurality of different items is equal to the updated total bid price, and
  electronically transmit the computed updated bid prices for the plurality of different items to said bidding portion, wherein said bidding portion electronically receives the computed updated bid prices and electronically accepts the user's bid for the online auction listing by accepting each individual computed updated bid price for each respective item within the online auction listing,
wherein said bidding portion and said unit pricing portion are implemented using at least one processor and at least one memory.

9. An apparatus according to claim 8, wherein the limit price for each of the plurality of different items is a floor price.

10. An apparatus according to claim 8, wherein the initial bid price for each of the plurality of different items is a price that a corresponding bidder has set as a goal.

11. An apparatus according to claim 8, wherein said unit pricing portion electronically computes the price difference between the limit price and the initial bid price for each of the plurality of different items, determines the item of the plurality of different items having the smallest price difference, and sets the bid price for the item to be the initial bid price corresponding to the item.

12. A method for computing a bid price for each one of a plurality of different items within an online auction system that includes a bidding portion and a unit pricing portion, comprising:
electronically receiving, by the bidding portion, a request for an online auction listing for a plurality of different items, the plurality of different items including a first item and a second item different from the first item;
electronically creating, by the bidding portion, the online auction listing corresponding to the request;
electronically receiving, by the bidding portion and from a user, an initial bid for the online auction listing, the initial bid including:
  a limit price for the first item,
  an initial bid price for the first item,
  a limit price for the second item,
  an initial bid price for the second item, and
  a limit price and an initial bid price for each remaining one of the plurality of different items,
electronically computing, based on the initial bid prices for the plurality of different items, an initial total bid price for an entirety of the plurality of different items;
electronically generating an updated bid in response to a change in status of the online auction listing, wherein the updated bid includes an updated total bid price for the entirety of the plurality of different items of the online auction listing but does not include updated bid prices for individual different items of the online auction listing;
electronically computing, by the unit pricing portion for the user's updated bid, an updated bid price for the first item, an updated bid price for the second item, and an updated bid price for each remaining one of the plurality of different items, the updated bid price for each respective item electronically computed by electronically computing a weight for the respective item in accordance with the limit price and the initial bid price for the respective item from the user's initial bid, wherein a sum of the computed updated bid prices for the entirety of the plurality of different items is equal to the updated total bid price;

electronically transmitting, by the unit pricing portion, the computed updated bid prices for the plurality of different items to the bidding portion;

electronically receiving, by the bidding portion, the computed updated bid prices for the plurality of different items corresponding to the user's updated bid;

electronically accepting, by the bidding portion, the user's updated bid for the online auction listing by accepting each individual computed updated bid price for each respective item within the online auction listing; and electronically determining, by the bidding portion, a winning bid corresponding to the online auction listing, the winning bid including:
- a sale price for the first item,
- a sale price for the second item, and
- a sale price for each remaining one of the plurality of different items within the online auction listing, wherein the bidding portion and the unit pricing portion are implemented using at least one processor and at least one memory.

13. A method according to claim 12, wherein the limit price for each of the plurality of different items is a floor price.

14. A method according to claim 12, wherein the initial bid price for each of the plurality of different items is a price that a corresponding bidder has set as a goal.

15. A method for computing a bid price for each one of a plurality of different items within an online auction system that includes a bidding portion and a unit pricing portion, comprising:

electronically receiving, by the bidding portion, a request for an online auction listing for a plurality of different items, the plurality of different items including a first item and a second item different from the first item;

electronically creating, by the bidding portion, the online auction listing corresponding to the request;

electronically receiving, by the bidding portion and from a user, an initial bid for the online auction listing, the initial bid including:
- a limit price for the first item,
- an initial bid price for the first item,
- a limit price for the second item,
- an initial bid price for the second item, and
- a limit price and an initial bid price for each remaining one of the plurality of different items, electronically computing, based on the initial bid prices for the plurality of different items, an initial total bid price for an entirety of the plurality of different items;

electronically generating an updated bid in response to a change in status of the online auction listing, wherein the updated bid includes an updated total bid price for the entirety of the plurality of different items of the online auction listing but does not include updated bid prices for individual different items of the online auction listing;

electronically computing, by the unit pricing portion for the user's updated bid, an updated bid price for the first item, an updated bid price for the second item, and an updated bid price for each remaining one of the plurality of different items, wherein:
  (1) a fixed proportion corresponding to the updated bid is electronically computed in accordance with the limit prices and the initial bid prices for the plurality of different items from the user's initial bid,
  (2) the updated bid price for each respective item is electronically computed in accordance with:
    (a) the limit price for the respective item from the user's initial bid,
    (b) the initial bid price for the respective item from the user's initial bid, and
    (c) the fixed proportion, and
  (3) a sum of the computed updated bid prices for the entirety of the plurality of different items is equal to the updated total bid price;

electronically transmitting, by the unit pricing portion, the computed updated bid prices for the plurality of different items to the bidding portion;

electronically receiving, by the bidding portion, the computed updated bid prices for the plurality of different items corresponding to the user's updated bid;

electronically accepting, by the bidding portion, the user's updated bid for the online auction listing by accepting each individual computed updated bid price for each respective item within the online auction listing; and electronically determining, by the bidding portion, a winning bid corresponding to the online auction listing, the winning bid including:
- a sale price for the first item,
- a sale price for the second item, and
- a sale price for each remaining one of the plurality of different items within the online auction listing, wherein the bidding portion and the unit pricing portion are implemented using at least one processor and at least one memory.

16. A method according to claim 15, wherein the limit price for each of the plurality of different items is a floor price.

17. A method according to claim 15, wherein the initial bid price for each of the plurality of different items is a price that a corresponding bidder has set as a goal.

18. A method according to claim 15, wherein said bid price electronic computing step electronically computes the bid price for each one of the plurality of different items by:
  (1) electronically computing the fixed proportion in accordance with:
    (a) the updated total bid price,
    (b) a sum of the limit prices for the plurality of different items from the user's initial bid, and
    (c) a sum of the initial bid prices for the plurality of different items from the user's initial bid, and
  (2) for each respective item, applying the fixed proportion to the respective item.

19. A method for computing a bid price for a plurality of different items within an online auction system that includes a bidding portion and a unit pricing portion, comprising:

electronically receiving, by the bidding portion, a request for an online auction listing for a plurality of different items, the plurality of different items including a first item and a second item different from the first item;

electronically creating, by the bidding portion, the online auction listing corresponding to the request;

electronically receiving, by the bidding portion and from a user, an initial bid for the online auction listing, the initial bid including:
- a limit price for the first item,
- an initial bid price for the first item,
- a limit price for the second item,
- an initial bid price for the second item, and a limit price and an initial bid price for each remaining one of the plurality of different items, electronically computing, based on the initial bid prices for the plurality of different items, an initial total bid price for an entirety of the plurality of different items;

electronically generating an updated bid in response to a change in status of the online auction listing, wherein the updated bid includes an updated total bid price for the entirety of the plurality of different items of the online auction listing but does not include updated bid prices for individual different items of the online auction listing;

electronically computing, by the unit pricing portion for the user's updated bid, an updated bid price for the first item, an updated bid price for the second item, and an updated bid price for each remaining one of the plurality of different items, wherein:

(1) the updated bid prices for the plurality of different items are electronically computed by:

(a) electronically computing a price difference between the limit price and the initial bid price for each one of the plurality of different items, and (b) determining the item, out of the plurality of different items, which has the smallest computed price difference, and (2) a sum of the computed updated bid prices for the entirety of the plurality of different items is equal to the updated total bid price;

electronically transmitting, by the unit pricing portion, the computed updated bid prices for the plurality of different items to the bidding portion;

electronically receiving, by the bidding portion, the computed updated bid prices for the plurality of different items corresponding to the user's updated bid;

electronically accepting, by the bidding portion, the user's updated bid for the online auction listing by accepting each individual computed updated bid price for each respective item within the online auction listing; and electronically determining, by the bidding portion, a winning bid corresponding to the online auction listing, the winning bid including:

a sale price for the first item, a sale price for the second item, and a sale price for each remaining one of the plurality of different items within the online auction listing, wherein the bidding portion and the unit pricing portion are implemented using at least one processor and at least one memory.

20. A method according to claim 19, wherein the limit price for each of the plurality of different items is a floor price.

21. A method according to claim 19, wherein the initial bid price for each of the plurality of different items is a price that a corresponding bidder has set as a goal.

22. A method according to claim 19, wherein said bid price electronic computing step electronically computes the price difference between the limit price and the initial bid price for each of the plurality of different items, determines the item of the plurality of different items having the smallest price difference, and sets the bid price for the item to be the initial bid price corresponding to the item.

23. A non-transitory computer-readable storage medium for storing a computer program that computes a bid price for each one of a plurality of different items, wherein the computer program, when executed, causes a computer, which includes at least one processor and at least one memory, to function as an online auction system that includes a bidding portion and a unit pricing portion and to perform the steps of:

electronically receiving, by the bidding portion, a request for an online auction listing for a plurality of different items, the plurality of different items including a first item and a second item different from the first item;

electronically creating, by the bidding portion, the online auction listing corresponding to the request;

electronically receiving, by the bidding portion and from a user, an initial bid for the online auction listing, the initial bid including:

a limit price for the first item, an initial bid price for the first item, a limit price for the second item, an initial bid price for the second item, and a limit price and an initial bid price for each remaining one of the plurality of different items, electronically computing, based on the initial bid prices for the plurality of different items, an initial total bid price for an entirety of the plurality of different items;

electronically generating an updated bid in response to a change in status of the online auction listing, wherein the updated bid includes an updated total bid price for the entirety of the plurality of different items of the online auction listing but does not include updated bid prices for individual different items of the online auction listing;

electronically computing, by the unit pricing portion for the user's updated bid, an updated bid price for the first item, an updated bid price for the second item, and an updated bid price for each remaining one of the plurality of different items, the updated bid price for each respective item electronically computed by electronically computing a weight for the respective item in accordance with the limit price and the initial bid price for the respective item from the user's initial bid, wherein a sum of the computed updated bid prices for the entirety of the plurality of different items is equal to the updated total bid price;

electronically transmitting, by the unit pricing portion, the computed updated bid prices for the plurality of different items to the bidding portion;

electronically receiving, by the bidding portion, the computed updated bid prices for the plurality of different items corresponding to the user's updated bid;

electronically accepting, by the bidding portion, the user's updated bid for the online auction listing by accepting each individual computed updated bid price for each respective item within the online auction listing; and electronically determining, by the bidding portion, a winning bid corresponding to the online auction listing, the winning bid including:

a sale price for the first item, a sale price for the second item, and a sale price for each remaining one of the plurality of different items within the online auction listing.

24. A non-transitory computer-readable storage medium for storing a computer program that computes a bid price for each one of a plurality of different items, wherein the computer program, when executed, causes a computer, which includes at least one processor and at least one memory, to function as an online auction system that includes a bidding portion and a unit pricing portion and to perform the steps of:

electronically receiving, by the bidding portion, a request for an online auction listing for a plurality of different items, the plurality of different items including a first item and a second item different from the first item;

electronically creating, by the bidding portion, the online auction listing corresponding to the request;

electronically receiving, by the bidding portion and from a user, an initial bid for the online auction listing, the initial bid including:
  a limit price for the first item,
  an initial bid price for the first item,
  a limit price for the second item,
  an initial bid price for the second item, and
  a limit price and an initial bid price for each remaining one of the plurality of different items, electronically computing, based on the initial bid prices for the plurality of different items, an initial total bid price for an entirety of the plurality of different items;

electronically generating an updated bid in response to a change in status of the online auction listing, wherein the updated bid includes an updated total bid price for the entirety of the plurality of different items of the online auction listing but does not include updated bid prices for individual different items of the online auction listing;

electronically computing, by the unit pricing portion for the user's updated bid, an updated bid price for the first item, an updated bid price for the second item, and an updated bid price for each remaining one of the plurality of different items, wherein:
  (1) a fixed proportion corresponding to the updated bid is electronically computed in accordance with the limit prices and the initial bid prices for the plurality of different items from the user's initial bid,
  (2) the updated bid price for each respective item is electronically computed in accordance with:
    (a) the limit price for the respective item from the user's initial bid,
    (b) the initial bid price for the respective item from the user's initial bid, and
    (c) the fixed proportion, and
  (3) a sum of the computed updated bid prices for the entirety of the plurality of different items is equal to the updated total bid price;

electronically transmitting, by the unit pricing portion, the computed updated bid prices for the plurality of different items to the bidding portion;

electronically receiving, by the bidding portion, the computed updated bid prices for the plurality of different items corresponding to the user's updated bid;

electronically accepting, by the bidding portion, the user's updated bid for the online auction listing by accepting each individual computed updated bid price for each respective item within the online auction listing; and electronically determining, by the bidding portion, a winning bid corresponding to the online auction listing, the winning bid including:
  a sale price for the first item,
  a sale price for the second item, and
  a sale price for each remaining one of the plurality of different items within the online auction listing.

25. A non-transitory computer-readable storage medium for storing a computer program that computes a bid price for each one of a plurality of different items, wherein the computer program, when executed, causes a computer, which includes at least one processor and at least one memory, to function as an online auction system that includes a bidding portion and a unit pricing portion and to perform the steps of:

electronically receiving, by the bidding portion, a request for an online auction listing for a plurality of different items, the plurality of different items including a first item and a second item different from the first item;

electronically creating, by the bidding portion, the online auction listing corresponding to the request;

electronically receiving, by the bidding portion and from a user, an initial bid for the online auction listing, the initial bid including:
  a limit price for the first item,
  an initial bid price for the first item,
  a limit price for the second item,
  an initial bid price for the second item, and
  a limit price and an initial bid price for each remaining one of the plurality of different items, electronically computing, based on the initial bid prices for the plurality of different items, an initial total bid price for an entirety of the plurality of different items;

electronically generating an updated bid in response to a change in status of the online auction listing, wherein the updated bid includes an updated total bid price for the entirety of the plurality of different items of the online auction listing but does not include updated bid prices for individual different items of the online auction listing;

electronically computing, by the unit pricing portion for the user's updated bid, an updated bid price for the first item, an updated bid price for the second item, and an updated bid price for each remaining one of the plurality of different items, wherein:
  (1) the updated bid prices for the plurality of different items are electronically computed by:
    (a) electronically computing a price difference between the limit price and the initial bid price for each one of the plurality of different items, and
    (b) determining the item, out of the plurality of different items, which has the smallest computed price difference, and
  (2) a sum of the computed updated bid prices for the entirety of the plurality of different items is equal to the updated total bid price;

electronically transmitting, by the unit pricing portion, the computed updated bid prices for the plurality of different items to the bidding portion;

electronically receiving, by the bidding portion, the computed updated bid prices for the plurality of different items corresponding to the user's updated bid;

electronically accepting, by the bidding portion, the user's updated bid for the online auction listing by accepting each individual computed updated bid price for each respective item within the online auction listing; and electronically determining, by the bidding portion, a winning bid corresponding to the online auction listing, the winning bid including:
  a sale price for the first item,
  a sale price for the second item, and
  a sale price for each remaining one of the plurality of different items within the online auction listing.

* * * * *